United States Patent
Wu et al.

(10) Patent No.: US 7,652,779 B2
(45) Date of Patent: Jan. 26, 2010

(54) IMAGE-FORMING SYSTEM WITH A GRAPHICAL USER INTERFACE HAVING AN INTERCONNECTION ARCHITECTURE

(75) Inventors: Michael Wu, Fairport, NY (US); Robert K. Holzwarth, Palmyra, NY (US); Karl Heinz Kremer, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 699 days.

(21) Appl. No.: 10/235,557

(22) Filed: Sep. 5, 2002

(65) Prior Publication Data

US 2003/0053127 A1    Mar. 20, 2003

Related U.S. Application Data

(60) Provisional application No. 60/317,697, filed on Sep. 5, 2001.

(51) Int. Cl.
*G06F 3/12* (2006.01)
*G06F 9/44* (2006.01)
*G06F 3/00* (2006.01)

(52) U.S. Cl. ............ 358/1.15; 358/1.13; 717/163; 715/866

(58) Field of Classification Search ........... 358/1.13, 358/1.9, 1.15; 382/173; 707/100, 10; 345/661, 345/168

See application file for complete search history.

(56) References Cited

U.S. PATENT DOCUMENTS

| | | | |
|---|---|---|---|
| 6,006,279 A * | 12/1999 | Hayes | 719/328 |
| 6,216,112 B1 * | 4/2001 | Fuller et al. | 705/14 |
| 6,268,927 B1 | 7/2001 | Lo et al. | 358/1.15 |
| 6,608,697 B1 * | 8/2003 | Schorr et al. | 358/1.15 |
| 6,681,043 B1 * | 1/2004 | Lau et al. | 382/173 |
| 6,886,028 B1 * | 4/2005 | Matsuyama et al. | 709/203 |
| 6,931,407 B1 * | 8/2005 | Brown | 707/100 |
| 2001/0043346 A1 * | 11/2001 | Roztocil et al. | 358/1.9 |
| 2002/0067498 A1 * | 6/2002 | Chapman | 358/1.13 |
| 2005/0262437 A1 * | 11/2005 | Patterson et al. | 715/517 |

FOREIGN PATENT DOCUMENTS

GB         2 350 459 A    11/2000

* cited by examiner

*Primary Examiner*—Mark K Zimmerman
*Assistant Examiner*—Vincent Rudolph
(74) *Attorney, Agent, or Firm*—William R. Zimmerli; Peyton C. Watkins

(57) ABSTRACT

An image-forming system with a graphic user interface having an interconnection architecture where software applications share one or more plug-in packages. One of the software applications may be used as a plug-in.

9 Claims, 4 Drawing Sheets

IMAGE-FORMING SYSTEM WITH A GRAPHICAL USER INTERFACE HAVING AN INTERCONNECTION ARCHITECTURE

CROSS REFERENCE TO RELATED APPLICATIONS

This application claims the benefit of the filing date Provisional Application Serial No. 60/317,697 entitled "IMAGE-FORMING SYSTEM WITH A GRAPHICAL USER INTERFACE HAVING AN INTERCONNECTION ARCHITECTURE" filed on Sep. 5, 2001.

FIELD

This invention generally relates to image-forming systems having a graphic user interface. More particularly, this invention relates to image-forming machines and methods using a graphic user interface with an interconnection architecture where a software application implements a functionality and provides a plug-in interface with another software application.

BACKGROUND

An image-forming system transfers images from original documents onto paper or other medium to create a finished product such as a booklet, a folded brochure, or a tabbed notebook. The original documents may be in hard copy (paper or other medium) or in electronic form (floppy disk, compact disc, and the like) or may be transmitted over a network such as the Internet. A "print job" is the combination of original documents with instructions for producing the finished product.

Many image-forming systems have a graphic user interface (GUI) for visually representing and controlling the transfer of images for a print job. The GUI permits the creation and manipulation of relationships and associations among various components of the image-forming machine and the print job. These relationships and associations may be displayed using a hierarchical approach like a tree structure or file folder structure or using some alternate form of visual indication.

The GUI typically uses multiple software applications for implementing the various functionalities in the image-forming machine. These software applications communicate and otherwise interact with each other to provide the relationships and associations among various components of the image-forming machine and the print job. The more a software product is used, the more potential new features are exposed. Traditional software packages generally are difficult to extend. Usually, only the software company that developed the product may make changes to the software application. A new functionality desired by a customer may not fit in with the software company's goals and strategies and thus may never be implemented by the software company.

Several software products offer "plug-in" interfaces to permit the addition of new functionality, which may be added by a party other than the creator of the software product. A plug-in interface permits new functionality to be implemented in a separate plug-in package. The "plug-in" package includes additional software that interacts with the original software application through the plug-in interface. A software product supporting a plug-in interface may have multiple plug-in software packages depending upon the number of available functionalities.

Many image-forming systems have one software application that provides an image-forming management functionality and another software application that provides a document or imaging viewing functionality. Ideally, these two applications will be interconnected in some way. One methodology commonly used for such inter-process communication is the Common Object Request Broker Architecture (CORBA). The use of an external inter-process communication package or interface (such as CORBA) increases the cost, the complexity of installation, and the maintenance of an image-forming system. When inter-connected software applications operate in separate process spaces, synchronization issues may arise (similar to those found in multi-threaded applications). Additional measures typically are implemented to avoid competitive conditions and event collisions between the software applications. These additional measures usually complicate the image-forming system.

Both of these software applications could however, include plug-in interfaces for addition of new functionality. The image-forming system could then be composed such that it would eliminate the aforementioned problems associated with extensibility, communications and synchronization.

SUMMARY

The invention provides an image-forming system having a graphic user interface with interconnection architecture where software applications implement functionalities and provide plug-in interfaces. The software applications share one or more plug-in packages connected to the plug-in interface. One of the software applications may itself be a plug-in to other applications.

In one aspect, the image-forming system has a graphic user interface with an interconnection architecture having an image-forming management functionality and a document viewing functionality. The interconnection architecture has a first software application to implement the image-forming management functionality and a second software application to implement the document viewing functionality. The first software application uses a plug-in interface with the second software application to share one or more plug-in packages with the second software application.

In another aspect, the image-forming system has a graphic user interface with an interconnection architecture having an image viewing functionality and an image-forming management functionality. The interconnection architecture has a first software application and a second software application. The first software application implements the image-viewing functionality. The second software application implements the image-forming management functionality. The first software application provides a plug-in interface used by the second software application. The first and second software applications share one or more plug-in packages in essentially the same process space. The plug-in packages include the second software application.

In a further aspect, the image-forming system has a graphical user interface with an interconnection architecture. The image-forming system also has a first software application, a second software application, and one or more plug-in packages. The first software application has a first plug-in interface. The second software application has a second plug-in interface. The one or more plug-in packages are connected to the first and second plug-in interfaces. The first and second software applications share the one or more plug-in packages in essentially the same process space.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
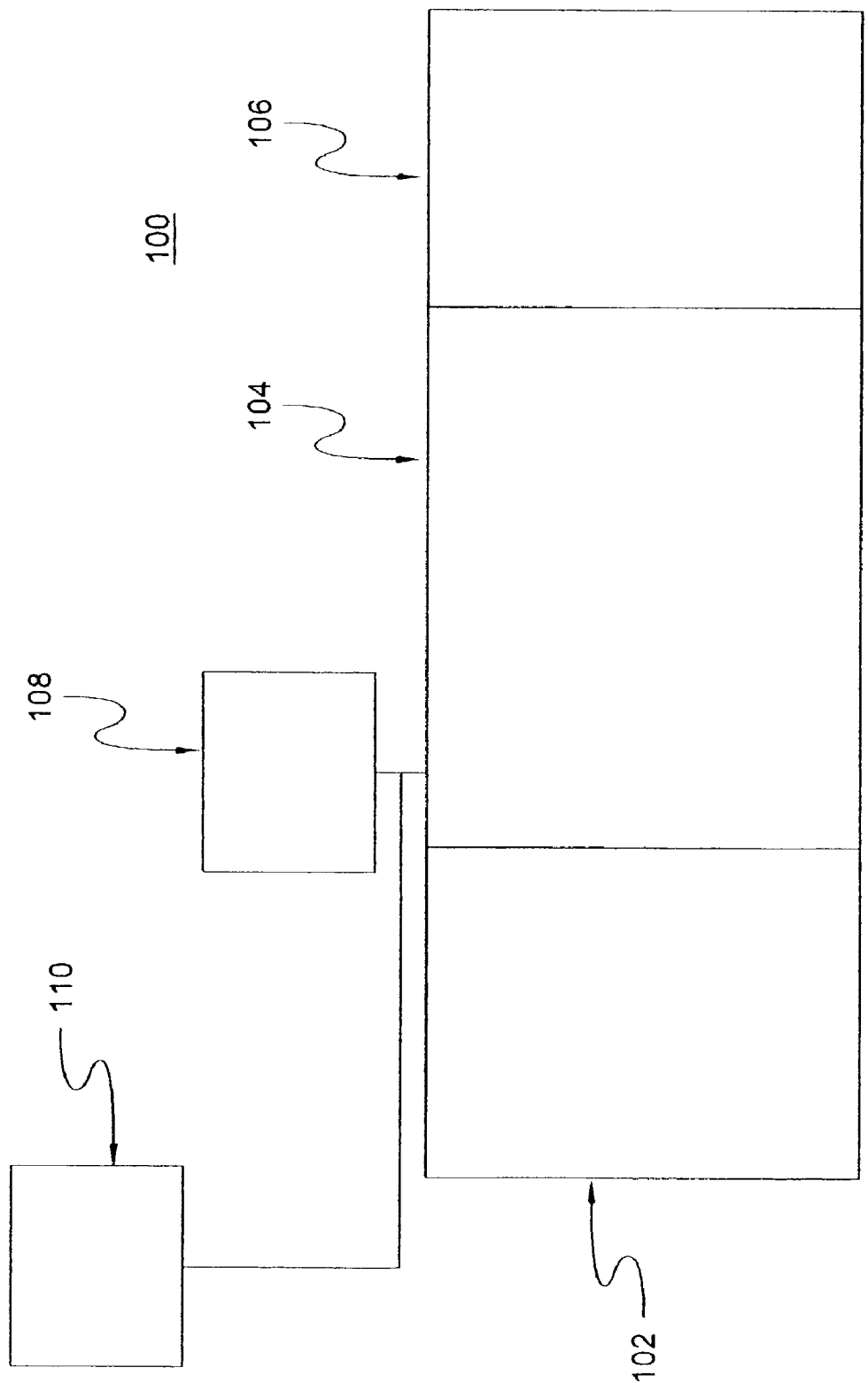
FIG. 1 represents a block diagram of an image-forming machine having a graphic user interface with interconnection architecture where a software application implements a functionality and provides a plug-in interface with another software application.

FIG. 1 represents a block diagram of an image-forming machine 100 having a graphic user interface (GUI) 110 with interconnection architecture where a software application implements a functionality and provides a plug-in interface with another software application. As described below, the software application implements a document or image-viewing functionality and also provides the plug-in interface to another software application implementing an image-forming management functionality in the image-forming machine 100. Other or additional software applications may be used to implement a functionality and provide a plug-in interface. While particular configurations and arrangements are shown, other configurations and arrangements may be used including those with other and additional components.

The image-forming machine 100 may be an electrophotographic device such as one of the Digimaster® digital printers manufactured by Heidelberg Digital L.L.C. located in Rochester, N.Y. The image-forming machine 100 also may be another electrophotographic machine, a photocopy machine, a printing device, or the like. In addition to the GUI 110, the image-forming machine 100 has a feeder 102, a marking engine 104, a finisher 106, and a printer use interface 108. The image-forming machine 100 may have other equipment. The feeder 102, the marking engine 104, the finisher 106, and the printer user interface 108 may be separate or integrated components. The printer user interface 108 may be a display unit with push buttons (not shown) or other activation means for inputting control parameters to the image-forming machine 100.

The feeder 102 provides the printing or copying sheets to the printing engine 104. The sheets may be one or a combination of paper, transparencies, and other medium. The sheets may be configured with pre-punched holes, tabs, and the like. In one aspect, the marking engine 104 includes a photoconductor (not shown), one or more chargers (not shown), an exposure machine (not shown), a toning station (not shown), and a fuser station (not shown). In operation, the photoconductor is selectively charged and optically exposed to form an electrostatic latent image on the surface. Toner is deposited onto the photoconductor surface. The toner is charged, thus adhering to the photoconductor surface in areas corresponding to the electrostatic latent image. The toner image is transferred onto the sheet. In the fuser station, the sheet is heated causing the toner to fix or adhere to the paper or other medium. The sheet exits the marking engine 104 and enters the finisher 106, which may discharge the sheet as is or may perform one or more finishing operations such as stapling, folding, and inserting an inserted sheet.

In one aspect, the GUI 110 is a separate component such as a dedicated desktop or other personal computer operatively connected to the image-forming machine 100. The GUI 110 also may be integrated with the printer user interface 108 or other components of the image-forming machine 100. The GUI 110 is operatively connected to a logic control unit (not shown) in the image-forming machine 100. Operatively connected includes transmission or communication means such as electrical, radio, network, and the like. The GUI and the logic control unit also may be integrated into the same component. The logic control unit is connected to control the feeder 102, the marking engine 104, the finisher 106, and the printer user interface 108. The GUI 110 comprises a display screen (not shown) and an interfacing means such as a touch screen (not shown), a keyboard (not shown), a mouse (not shown), a track ball (not shown), or a combination thereof. The GUI 110 also may include tear-off menus, floating buttons, dialog boxes, alternate keyboard command and mouse shortcuts, and other alternative user interfaces.

The GUI 110 provides visual interaction with the image-forming machine 100 using one or more applications that implement one or more functionalities such as a document or image viewing functionality and an image-forming management functionality. In one aspect, document and image-forming management functionalities are implemented via a plug-in architecture. A plug-in architecture allows enhancements and updates to be incorporated in a simpler and more efficient manner and without requiring recompilation of all of the program codes that implement the functionalities. Other architectures may be used.

The document or image viewing functionality provides a viewing window for viewing electronic images of the original documents in a print job by providing the ability to view each page. In one aspect, an Adobe Acrobats®, Version 5.0 software application, manufactured by Adobe Systems, Inc. located in San Jose, Calif., implements the document or image viewing functionality on the image-forming machine 100. The documents are formatted in Portable Document Format (PDF) which is a universal electronic document file format that preserves all the fonts, formatting, graphics, and color of any source document, regardless of the application and platform used to create it. PDF files are compact and can be shared, viewed, navigated, and printed exactly as intended. It also has a plug-in interface architecture that lets one incorporate the image-forming management functionality. Other document or image viewing software applications may be used. The image-forming management functionality integrates applications that implement, control, or manage the image-forming machine 100. The image-forming management functionality is a graphical user interface that visually represents objects (documents, tickets, other entities, operations, and the like) with elements such as icons, tree structures, pull-down menus, pop-up menus, tool buttons, slide controls, and the like which are well known in the art. A user may interact with the image-forming management functionality using various interaction means such as the touch screen, the mouse, the track ball, and the keyboard. Such interaction with the visual representations results in manipulation of the underlying objects. While the image-forming management functionality may have an object-oriented appearance, the implementation of the functionality may be by an object oriented programming language or a non-object oriented programming language. In one aspect, the image-forming management functionality is implemented by an ImageSmart® Document Mastering SmartBoard™ software application used with Digimaster® digital printers manufactured by Heidelberg Digital L.L.C. located in Rochester, N.Y. Other image-forming management software applications may be used.

Figure 2:
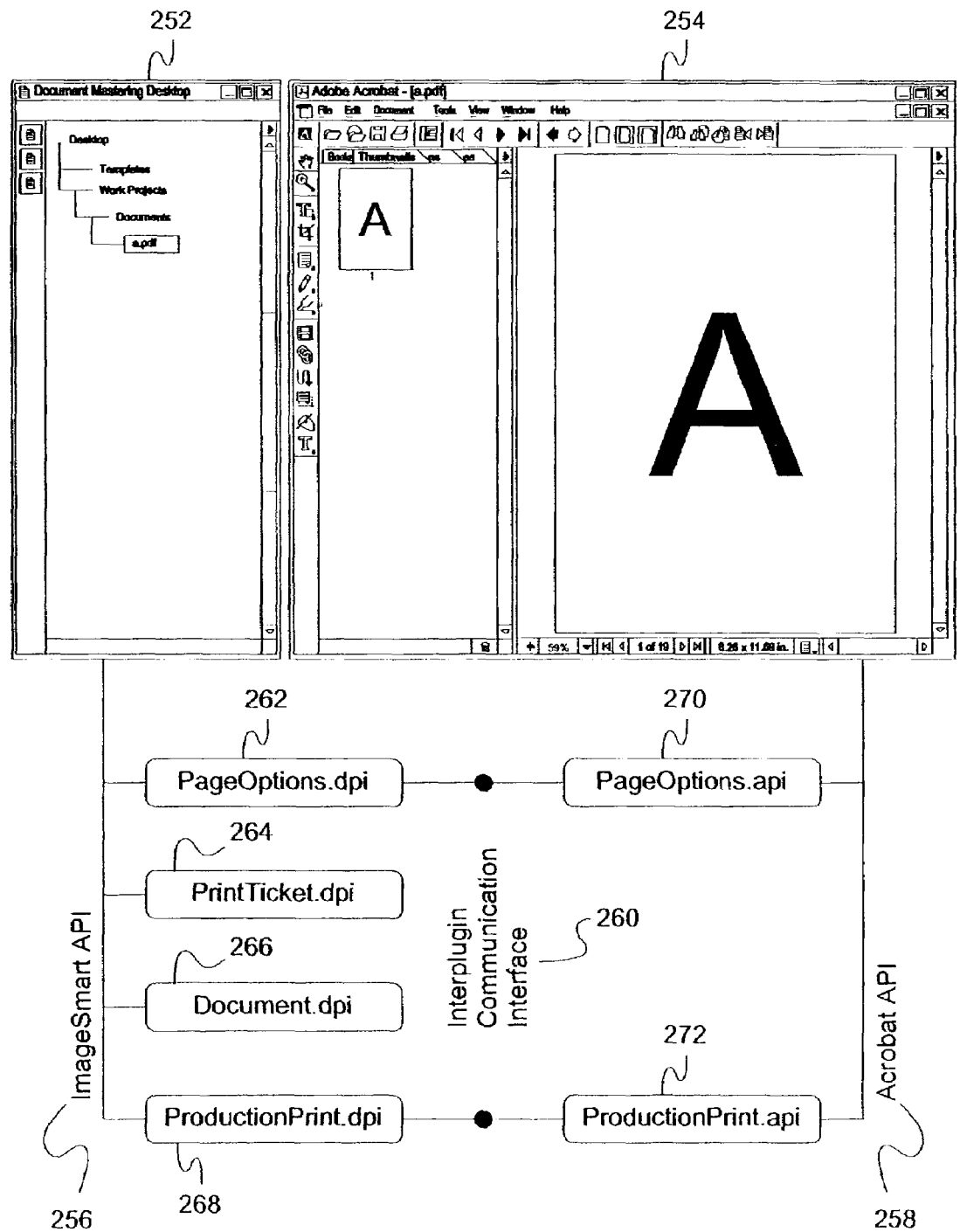
FIG. 2 represents a block diagram showing the interconnection architecture of a first software application with a second software application according to a first embodiment.

FIG. 2 represents a block diagram showing the interconnection architecture 250 of the ImageSmart® Document Mastering SmartBoard™ software application 252 with Adobe Acrobat® software application 254 according to a first embodiment. The SmartBoard™ 252 has an ImageSmart application-programming interface 256 connected to a page options desktop plug-in 262, a print ticket desktop plug-in 264, a document desktop plug-in 266, and a production print desktop plug-in 268. The desktop plug-in packages 262, 264, 266, and 268 are additional software applications provided with the ImageSmart® Document Mastering SmartBoard™ 252, which serves as a master plug-in to host the aforementioned desktop plug-in packages and additional plug-ins. The desktop plug-in packages 262, 264, 266, and 268 may be provided by one or more other software applications. The page options plug-in enables a user to assign page level print options in a visual manner by creating elements like menu entries and toolbar icons that will either bring up the user interface, or will assign pre-defined sets of page features to the pages that are selected in the document viewing function's thumbnail pane. In addition, it may also create entries in the image-forming management function's window to display available page feature templates and a summary of the page features assigned to a document. The print ticket plug-in displays, manages, stores and retrieves saved job settings for each document on the user interface. It is responsible for retrieving and converting existing job ticket settings generated from other systems and saving the converted settings when the document is saved. The document plug-in maintains the image-forming management function's view of all open documents or files and implements the image-forming management services to open, save, close, and select documents. Additionally, the document plug-in exports a host function table (HFT), which provides an interface between plug-ins for sharing common information about opened documents. The document plug-in provides services (such as open, save, close, select, etc.) for displaying information about and the management of documents. These services are presented to the user through menus, tool buttons, drag and drop, document trees, etc. The document plug-in is also responsible for presenting and maintaining information displayed to the user about opened documents. Typical attributes may include, but are not limited to file name, file location, document title, and author. The production print facilitates the print output from the image-forming management function. It communicates with other plug-ins and the print engine and is responsible for communicating with the print engine and sending the document and associated data to the print engine. The Adobe Acrobat® 254 has an Acrobat application-programming interface 258 connected to a page options Acrobat plug-in 270 and a production print Acrobat plug-in 272. The plug-in packages 270 and 272 are additional software applications which support or are provided with the image-forming management package 252. The plug-in packages supporting the Adobe Acrobat® application-programming interface (Acrobat API) 270 and 272 may be provided by one or more other software applications. The SmartBoard™ plug-ins having interaction with the Adobe Acrobat® plug-ins have corresponding plug-ins such as page options and production print. The page options desktop plug-in 262 and the production print desktop plug-in 268 are connected respectively to the page options Acrobat plug-in 270 and the production print Acrobat plug-in 272 through an inter-plug-in interface 260. Additional and different plug-ins may be used and may have different configurations.

Figure 3:
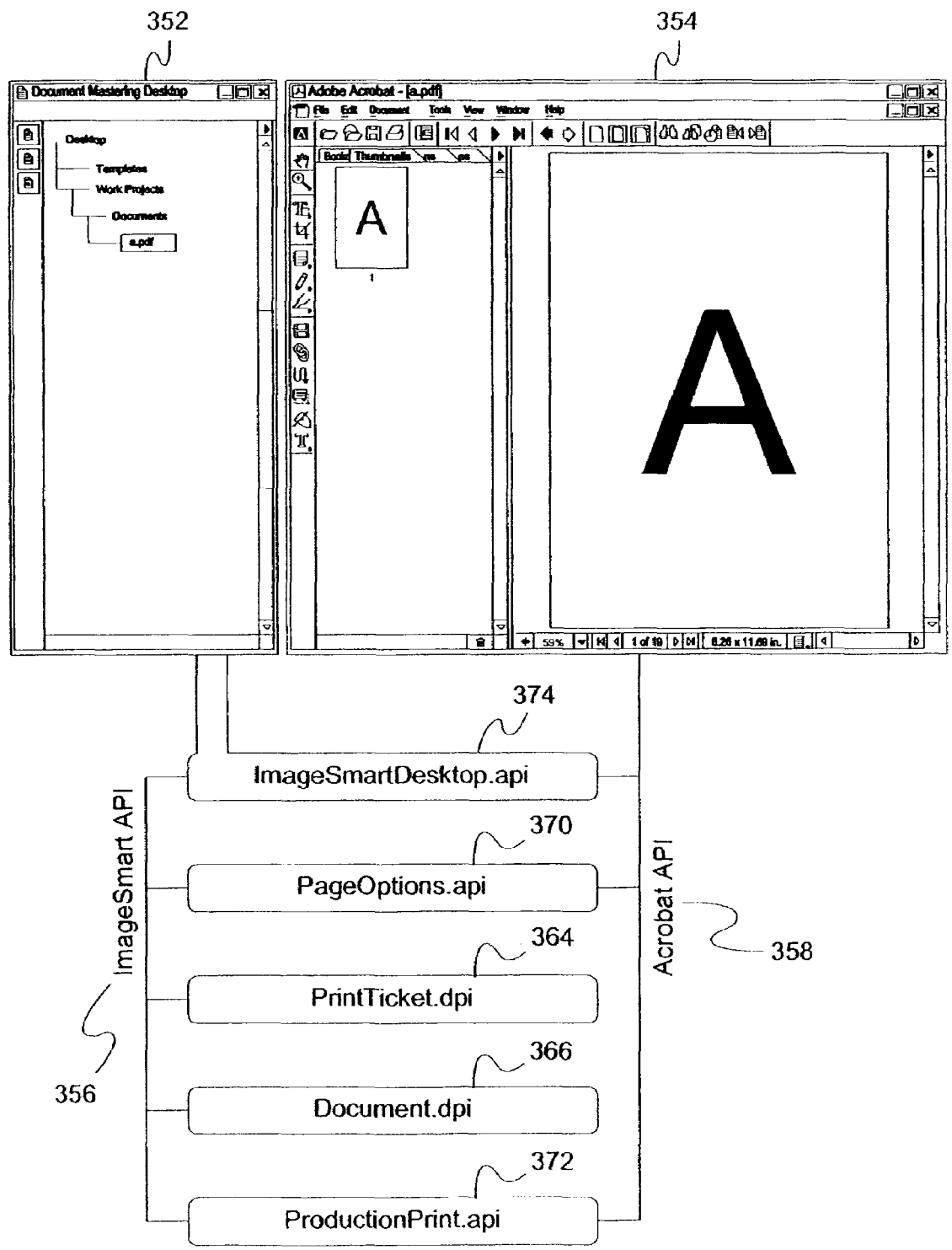
FIG. 3 represents a block diagram showing the interconnection architecture of a first software application with a second software application according to a second embodiment.

FIG. 3 represents a block diagram showing the interconnection architecture 350 of the ImageSmart® Document Mastering SmartBoard™ software application 352 with the Adobe Acrobat® software application 354 according to a second embodiment. The SmartBoard™ 352 has an ImageSmart application-programming interface 356. The Adobe Acrobat® 354 has an Acrobat application-programming interface 358. The page options plug-in 370 and a production print plug-in 372 that are provided with the ImageSmart® Document Mastering SmartBoard™ 374 interact with the SmartBoard application-programming interface 356 and with the Acrobat application-programming interface 358. A print ticket plug-in 364 and a document desktop plug-in 366 also are provided with the ImageSmart® Document Mastering SmartBoard™, but do not interface with the Acrobat application-programming interface 358. The plug-in packages 364, 366, 370, and 372 may be provided by one or more other software applications. The ImageSmart® Document Mastering SmartBoard™ software exports a plug-in interface and also is a plug-in to the Adobe Acrobat® application. The SmartBoard™ plug-ins 370, 372, and 374 support both interfaces 356 and 358 so that the SmartBoard™ and the Adobe Acrobat® may share the same plug-ins. By having one or more shared plug-ins that support two interfaces, there is less programming overhead. There also are fewer plug-ins to develop and fewer interfaces to support such as an inter-plug-in communication mechanism.

The Adobe Acrobat® or other software application 354 provides one functionality and essentially acts as a stand alone application. The ImageSmart® or another software application 352 provides an additional functionality and essentially becomes a "plug-in" for the Adobe Acrobat®. Accordingly, the document or image viewing functionality, the image-forming management functionality, and subordinate plug-in packages run essentially in the same process space, thus reducing or eliminating the need for complex synchronization schemes. The ImageSmart® or other application also supports its own plug-in interface. Subordinate plug-in packages may be shared between the Acrobat and ImageSmart application using both plug-in interfaces, such as the image-forming management API 356 and the Acrobat application programming interface 354. Alternatively, some plug-ins may only support the image-forming management API 356.

Figure 4:
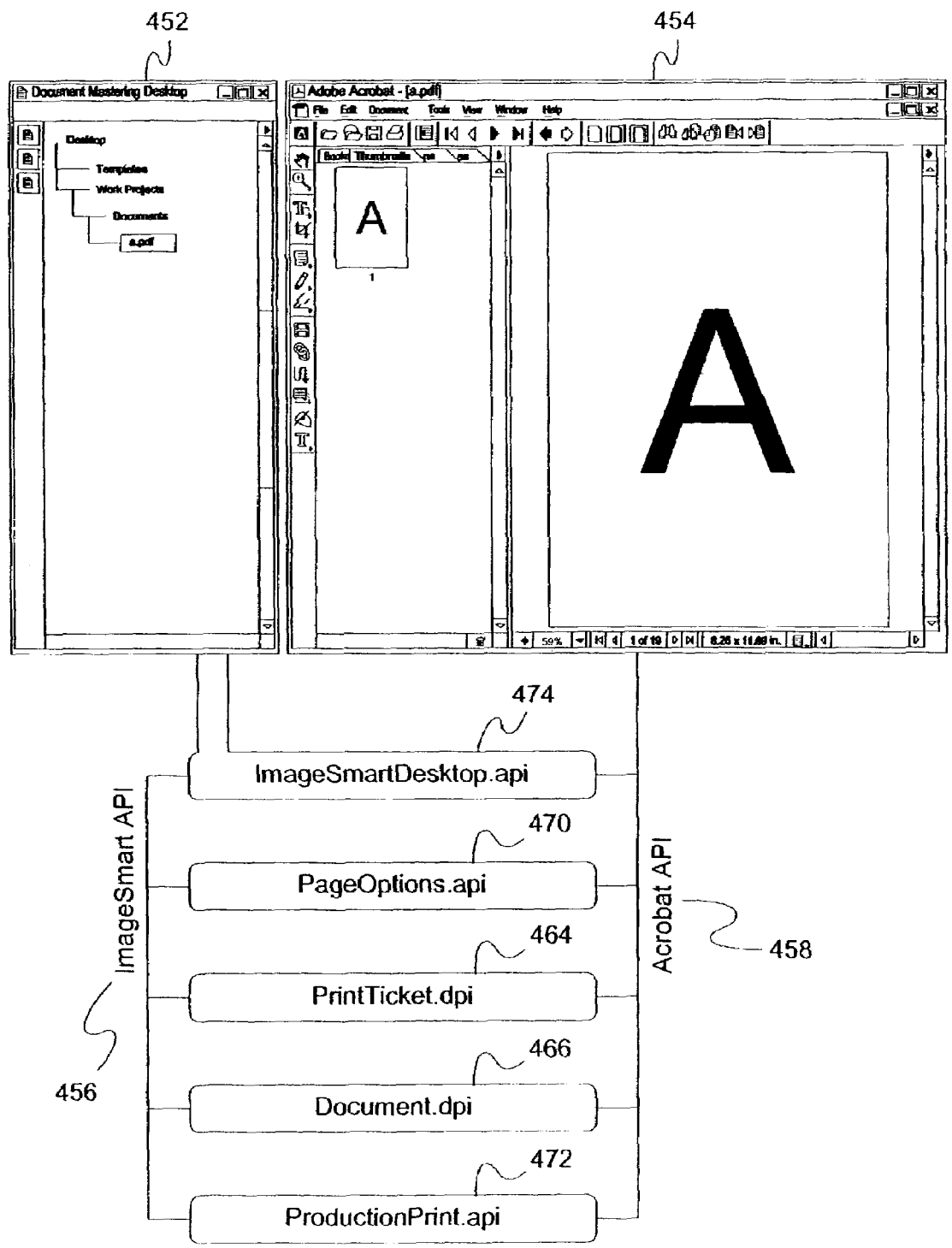
FIG. 4 represents a block diagram showing the interconnection architecture of a second software application with a second software application according to a third embodiment.

FIG. 4 represents a block diagram showing interconnection architecture 450 of the ImageSmart® Document Mastering SmartBoard™ software application 452 with Adobe Acrobat® software application 454 according to a third embodiment. The SmartBoard™ 452 has an ImageSmart application-programming interface 456. The Adobe Acrobat® 454 has an Acrobat application-programming interface 458. The ImageSmart application-programming interface 456 interfaces or connects with the Acrobat application-programming interface 458 through a page options plug-in 470, a production print plug-in 472, an ImageSmart Desktop plug-in 474, a print ticket plug-in 464, and a document plug-in 466. The plug-in packages 464, 466, 470, and 472 are provided with the ImageSmart® Document Mastering SmartBoard™ software application. The plug-in packages 464, 466, 470, and 472 may be provided by one or more other software applications. As previously discussed, the ImageSmart™ or other software application exports a plug-in interface and essentially is a plug-in to the Adobe Acrobat® or another software application.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. An image-forming system comprising:
   a printing engine; and
   a graphic user interface operatively connected to the printing engine, the graphic user interface having an interconnection architecture including:
   a first software application, providing an image viewing functionality, having a first plug-in interface;
   a second software application, which is a master plug-in to the first software application, providing an image-forming management functionality, having a second plug-in interface, said second software application being directly connected as a plug-in to said first software application by said first plug-in interface; and
   a first plug-in package directly connected as a plug-in to the first software application by the first plug-in interface and directly connected as a plug-in to the second software application by the second plug-in interface, wherein the first and second software applications share the the first plug-in package in essentially the same process space, using the plug-in interfaces; and
   a second separate plug-in package, different from the first plug-in package, directly connected as a plug-in to the first software application by the first plug-in interface and directly connected as a plug-in to the second software application by the second plug-in interface, wherein the first and second software applications share the second plug-in package in essentially the same process space, using the plug-in interfaces.

2. The image-forming system according to claim 1, wherein the first plug-in package and second plug-in package each comprises at least one of a page options plug-in package, a print ticket plug-in package, a document plug-in package, and a production print plug-in package.

3. A data processing system comprising:
   an image-forming machine; and
   a graphic user interface operatively connected to the image-forming machine, the graphic user interface having an interconnection architecture including:
   a first software application, providing an image viewing functionality, having a first plug-in interface;
   a second software application, which is a master plug-in to the first software application, providing an image-forming management functionality, having a second plug-in interface, said second software application being directly connected as a plug-in to said first software application by said first plug-in interface;
   a first plug-in package directly connected as a plug-in to the first software application by the first plug-in interface and directly connected as a plug-in to the second software application by the second plug-in interface, wherein the first and second software applications share first the plug-in package using the plug-in interfaces; and
   a second plug-in package, which is separate and different from the first plug-in package, directly connected as a plug-in to the first software application by the first plug-in interface and directly connected as a plug-in to the second software application by the second plug-in interface, wherein the first and second software applications share the second plug-in package using the plug-in interfaces.

4. One or more computer-accessible memories storing computer code for performing data processing, wherein the computer code comprises:
   a first software application, providing an image viewing functionality, having a first plug-in interface;
   a second software application, which is a master plug-in to the first software application, providing an image-forming management functionality, having a second plug-in interface, said second software application being directly connected as a plug-in to said first software application by said first plug-in interface; and
   a first plug-in package directly connected as a plug-in to both the first software application by the first plug-in interface and to the second software application by the second plug-in interface, wherein the first and second software applications share the first plug-in package using the plug-in interfaces; and
   a second plug-in package, which is separate and different from the first plug-in package, directly connected as a plug-in to the first software application by the first plug-in interface and directly connected as a plug-in to the second software application by the second plug-in interface, wherein the first and second software applications share the second plug-in package using the plug-in interfaces.

5. The one or more computer-accessible memories according to claim 4, wherein the first plug-in package and the second plug-in package each comprises one of a page options plug-in package, a print ticket plug-in package, a document plug-in package, and a production print plug-in package.

6. An image-forming system comprising:
   a printing engine; and
   a graphic user interface operatively connected to the printing engine, the graphic user interface having an interconnection architecture including:
   a first software application, providing an image viewing functionality, having a first plug-in interface;
   a first plurality of plug-in packages directly connected as plug-ins to said first software application by said first plug-in interface;
   a second software application, which is a master plug-in to the first software application, providing an image-forming management functionality, having a second plug-in interface;
   a second separate plurality of plug-in packages, different from the first plurality of plug-in packages, directly connected as plug-ins to said second software application by said second plug-in interface; and
   an inter-plug-in interface directly connected to each of said plug-in packages, said first and second pluralities of plug-in packages being connected to each other via said inter-plug-in interface.

7. The system claim 6 wherein each of said plurality of plug-in packages includes a plug-in package of a first type and a plug-in package of a second type, said plug-in packages of said first type being connected to each other by said inter-plug-in interface, said plug-in packages of said second type being connected to each other by said inter-plug-in interface.

8. The system of claim 7 wherein said first type of plug-in packages are page options plug-ins and said second type of plug-in packages are production print plug-ins.

9. An image-forming system comprising:
   a printing engine; and
   a graphic user interface operatively connected to the printing engine, the graphic user interface having an interconnection architecture including:
   a first software application, providing an image viewing functionality, having a first plug-in interface;
   a second software application, which is a master plug-in to the first software application, providing an image-forming management functionality, having a second plug-in interface; and
   a plurality of plug-in packages, in which each plug-in package is a separate plug-in and different from one another, each said plug-in package connecting said first plug-in interface to said second plug-in interface, wherein said plug-in packages include a page options plug-in, a production print plug-in, a print ticket plug-in, and a document plug-in.

* * * * *